Figure 1:
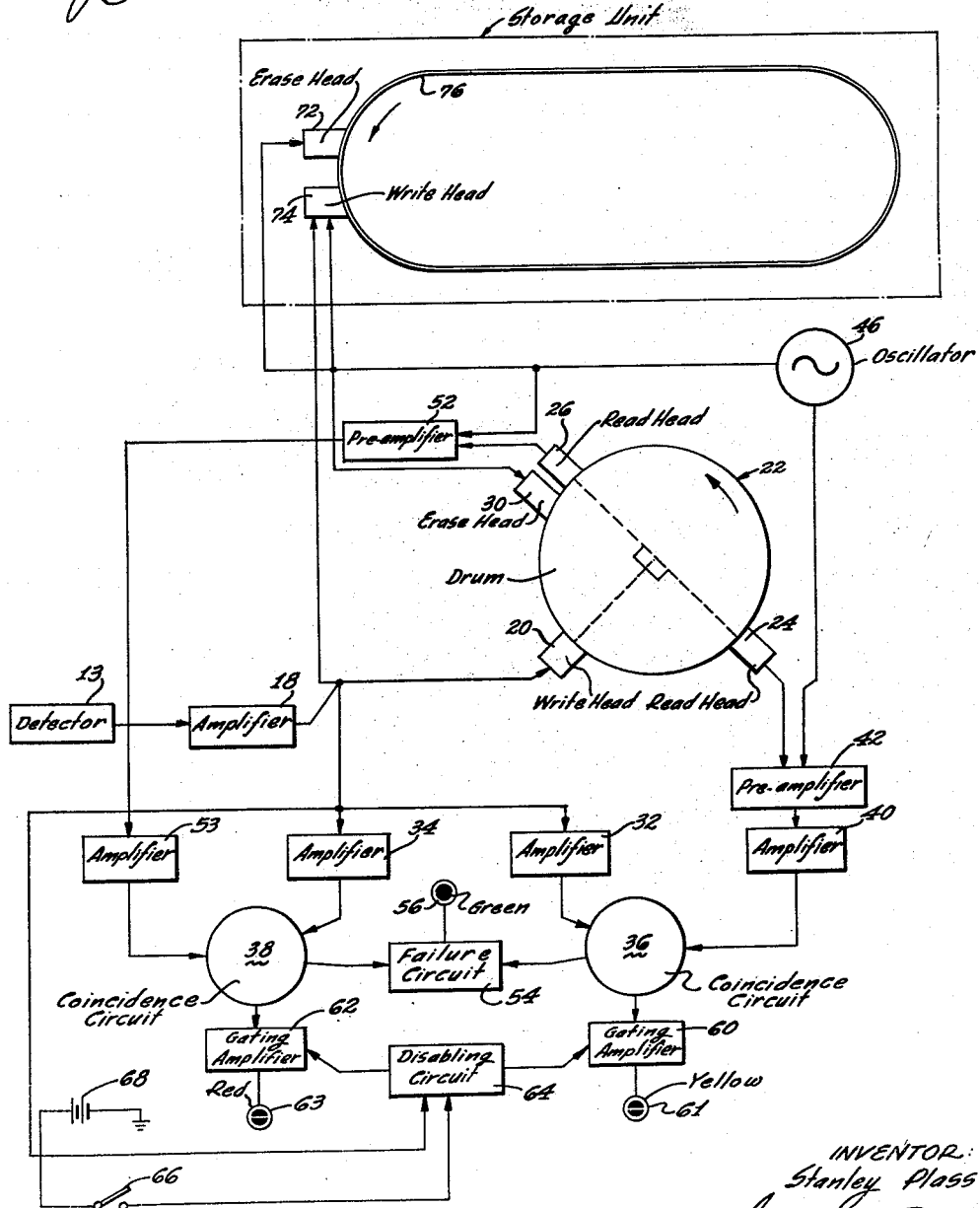

Oct. 18, 1960

S. PLASS 2,957,082

CONSTANT BEARING EVALUATOR

Filed March 24, 1958

2 Sheets-Sheet 2

INVENTOR.
Stanley Plass

By Smyth & Roston
Attorneys

United States Patent Office 2,957,082
Patented Oct. 18, 1960

2,957,082

CONSTANT BEARING EVALUATOR

Stanley Plass, Los Angeles, Calif., assignor to Packard-Bell Electronics Corporation, Los Angeles, Calif., a corporation of California Filed Mar. 24, 1958, Ser. No. 723,233

17 Claims. (Cl. 250—83.3)

This invention relates to apparatus for detecting a constant bearing of one movable member relative to a second movable member and more particularly relates to apparatus for detecting when the course of the second movable member relative to the first movable member will produce a collision between the movable members. The invention is especially adapted to be installed in airplanes so as to provide a warning to pilots as to when a collision with other airplanes is becoming imminent.

The number of airplanes used for commercial transportation, for private transportation and for freight haulage has been increasing considerably in successive years. Each airplane provides a limited range of vision so that blind spots are produced toward the side and the rear of the airplane. This prevents the pilot from obtaining a complete picture as to the other aircraft in his vicinity and as to the course of such other aircraft with respect to his own airplane. Furthermore, in bad weather the difficulties of the pilot in determining the locations of other aircraft become considerably increased even within the normal angles of vision of the pilot. These difficulties may be especially troublesome near airports since the number of aircraft in any given location near the airports become materially increased in comparison to the number of aircraft in other regions.

The problem of detecting a collision course between different aircraft has become especially important in view of several recent collisions of airplanes and in view of the large number of known near misses. Various attempts have been made by a great number of companies to provide apparatus which will give adequate warning to a pilot as to an impending collision with another airplane. Such attempts have not been successful for several reasons. One reason is that the proposed apparatus has been fairly complicated such that the duties imposed upon the pilot become burdensome in view of the substantial number of other instruments which the pilot must continually check during flight. Furthermore, the complicated nature of the proposed apparatus has prevented the apparatus from functioning for long periods of time without adjustments and without replacement of parts. Other disadvantages to the proposed apparatus result from the considerable amount of space required for the apparatus and the excess weight produced by the apparatus. These disadvantages are especially irksome in airplanes since space within the airplane is at a premium and since each pound of additional equipment carried by the airplane decreases the amount of load in the nature of freight and passengers which are capable of being carried by the airplane.

This invention provides apparatus for overcoming the above disadvantages. The apparatus constituting this invention is based upon the principle that two airplanes maintain a constant bearing relative to each other when they are approaching each other on a collision course. The apparatus includes means for scanning the atmosphere in a repetitive angular pattern from a searching airplane and for producing signals upon the detection of a second airplane in each scan. Storage means are included in the apparatus for storing in successive positions signal indications representing the detection or lack of detection of the second member at successive instants during each scan. The signal indications produced by the scanning means during each particular scan are compared with the signal indications recorded in the storage means for a previous scan. By providing such a comparison, an output indication representing a collision course is produced upon the occurrence in successive scans of signals representing a constant bearing of the second airplane relative to the first airplane.

The apparatus constituting this invention is simple in construction and reliable in operation. It may include infra-red means for detecting the presence of the second airplane during the angular scan. The storage means may include an annular magnetic drum and a write head, with the signals from the infra-red detector being introduced to the write head for recording on the drum. A read head is spaced from the write head by a particular distance along the annular length of the drum. In this way, the read head reads the signals recorded on the drum for a particular angular position in a previous scan at the same time that the write head is recording information for that angular position in the present scan. This allows the signals introduced to the write head at any instant to be compared with the signals read by the read head at that instant. By providing such a comparison, an output indication representing a collision course is produced upon the simultaneous occurrence in the write and read heads of signal indications representing the detection of the second airplane.

The apparatus constituting this invention also includes storage means for detecting a constant bearing between the first and second airplanes for two or more successive scans. For example, a visual indication of one color such as yellow may be provided to represent caution to the pilot when a collision course is detected for two successive scans, and a visual indication of a second color such as red may be provided to represent a warning to the pilot when a collision course is detected for four successive scans. Means are also included for testing the reliability in the operation of the equipment in successive scans so that the pilot will rely on the equipment only when it is functioning properly.

Figure 2:
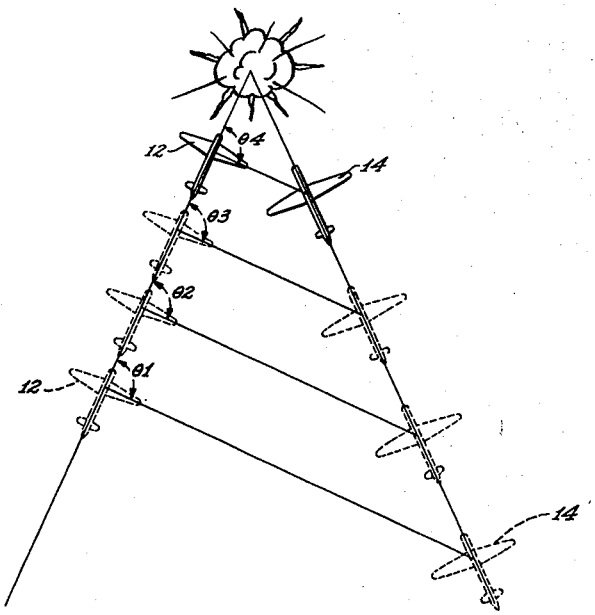
Figure 3:
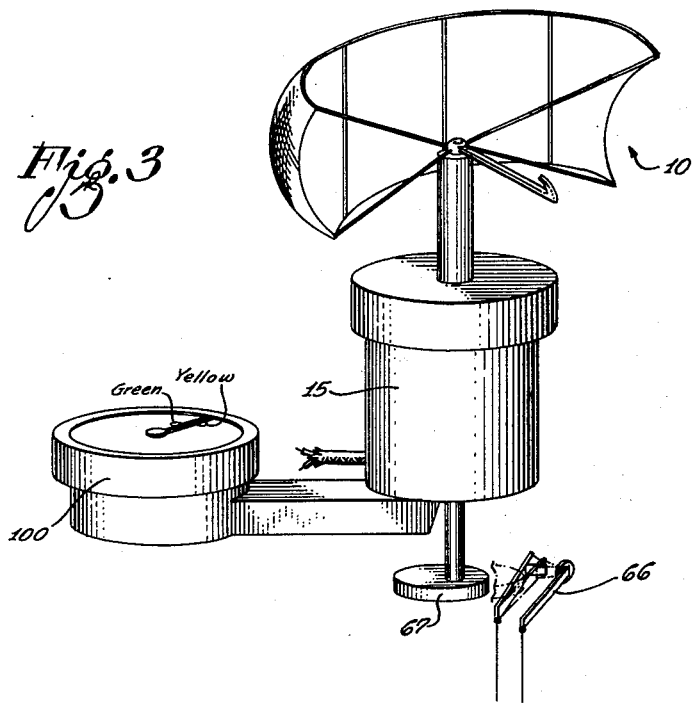

In the drawings:

Figure 1 is a diagram, somewhat in block form, illustrating the relationship between the various electrical stages included in one embodiment of the apparatus constituting this invention;

Figure 2 is a view which somewhat schematically illustrates successive positions of two aircraft approaching each other on a collision course and which further illustrates how the two aircraft maintain a substantially constant angular position relative to each other in a collision course; and Figure 3 is a perspective view schematically illustrating the scanning apparatus shown in Figure 1 and further illustrating a motor for driving the scanning apparatus and a switch operatively controlled in synchronous relationship with the movements of the scanning apparatus.

In one embodiment of the invention, scanning apparatus generally indicated at 10 in Figure 3 is mounted on a moving member such as an airplane 12 in Figure 2. A detector 13 in Figure 1 is coupled to the scanning means to detect the presence of other aircraft in the vicinity such as the presence of an aircraft 14 in Figure 2. The scanning apparatus 10 may be rotated at a constant angular speed in a suitable plane such as a horizontal plane to search for other aircraft such as the aircraft 14 at successive angular positions in the atmosphere. The cyclical angular movement of the scanning apparatus 10 may be obtained by coupling the apparatus to a suitable motor 15 (Figure 3) such as a synchronous motor. Although various types of scanning and detecting apparatus can be used, apparatus operating on infra-red principles is preferably employed. As is well known, infrared apparatus operates on the principle of detecting heat from objects such as aircraft in the vicinity of the searching airplane 12 so as to produce signals in accordance with the amount of heat detected at any instant.

The signals produced by the detector 13 are introduced through an amplifier 18 to a transducing head 20 which may be adapted to record signals in a storage member generally indicated at 22. The storage member 22 is constructed to present successive positions to the transducing head 20 such that information can be recorded in these positions by the transducing head. Preferably, the storage member 22 is a rotatable magnetic drum having a thin film of magnetic material on its annular periphery to retain magnetic information at successive positions on the drum. For example, magnetic signals of one polarity on the drum may indicate the lack of detection of an aircraft in the vicinity, and magnetic signals of an opposite polarity on the drum may indicate the detection of an aircraft in the vicinity. As another example, a lack of a magnetic signal at a particular position may indicate a lack of target detection whereas a magnetic signal at a particular position may indicate a target detection. When the storage member 22 is a magnetic drum, the transducing head 20 may be a magnetic head for recording information on the drum. Hereafter, the members 20 and 22 will be designated as the write head 20 and the magnetic drum 22.

As previously described, the magnetic drum 22 is rotatable so as to present successive angular positions on the drum for the reading and recording of information. For purposes of illustration, this direction of rotation of the drum 22 is illustrated by arrows in Figure 1 as being in a counter-clockwise direction. A transducing head such as a read head 24 is magnetically coupled to the drum 22 at a particular distance from the write head 20 in the direction of rotation of the drum. This particular distance corresponds to one complete revolution of the scanning apparatus 10 such that information recorded by the write head 20 at a particular angular position of scan in one cycle corresponds to the same angular position read by the head 24 in the previous scanning cycle.

Similarly, a read head 26 is disposed relative to the heads 20 and 24 so as to read the information relating to succecssive angular positions in one scan at the same time that information is being recorded by the head 20 at corresponding angular positions three cycles later. An erase head 30 is displaced from the head 26 in the direction of rotation of the drum 22 and is disposed between the heads 26 and 20 so as to produce signals of a uniform polarity in the successive positions of the drum before these positions become introduced to the write head 20. The heads 20, 24, 26 and 30 are displaced from the drum 22 by a relatively short distance in the order of 0.001 inch so as to provide an optimum magnetic coupling with the drum without producing any friction against the drum.

The signals from the amplifier 18 are also introduced to input terminals of amplifiers 32 and 34, the output terminals of which are respectively coupled to coincidence circuits 36 and 38.

The coincidence circuit 36 also receives signals from an output terminal of an amplifier 40, the input terminal of which is connected to a pre-amplifier stage 42. The operation of the pre-amplifier 42 is controlled by the signals from the read head 24 and an oscillator 46, which may be any suitable type of circuit such as a Hartley or Colpitts oscillator.

The coincidence circuit 36 may be constructed in a well known manner so as to produce a signal upon the simultaneous introduction of signals from the amplifiers 32 and 40. For example, the coincidence circuit 36 may be an amplifier which is negatively biased against conduction to such an extent that it can become conductive only upon the simultaneous introduction of signals from the amplifiers 32 and 40. The coincidence circuit 36 may also be formed in part from a pentode in which the signals from the amplifier 32 are introduced to the control grid and the signals from the amplifier 40 are introduced to the suppressor grid. In such an amplifier, the pentode can become conductive only upon the simultaneous introduction of signals from the amplifiers 32 and 40. The coincidence circuit 38 may be constructed in a manner similar to the coincidence circuit 36.

Just as the signals from the read head 24 and the oscillator 46 are introduced to the pre-amplifier 42, signals from the read head 26 and the oscillator 46 are introduced to a pre-amplifier stage 52. The output terminal of the pre-amplifier 42 is connected to the input terminal of an amplifier 53. The signal from the amplifier 53 pass to the coincidence circuit 38 and operate in conjunction with the signals from the amplifier 34 to control the passage of the signals through the coincidence circuit 38.

The output signals from the coincidence circuits 36 and 38 are introduced to a failure circuit 54, which may be constructed to pass signals upon the simultaneous introduction of signals from the coincidence circuits 36 and 38 at periodic intervals of time. For example, the failure circuit 54 may be a monostable multivibrator which is biased to maintain a first state of operation but which becomes triggered to a second state of operation upon the introduction of triggering pulses. The monostable multivibrator may then continue in this second state of operation for an indefinite period of time provided that triggering pulses are introduced to the multivibrator before the end of successive periods of time dependent upon the parameters of the multivibrator. Each of these periods of time may be slightly greater than the period of time required for the scanning apparatus 10 to complete each cycle of scan. The monostable multivibrator may be constructed in a manner similar to that disclosed on pages 2-44 to 2-52 of "Principles of Radar," by members of the staff of the Radar School, Massachusetts Institute of Technology, published by McGraw-Hill Book Co., New York, second edition, second impression, 1946. The signals produced by the monostable multivibrator in the second state of operation are introduced to an indicator such as a light bulb 56 on the instrument display panel at the front of the cockpit. The light bulb 56 may be provided with a distinctive color such as green to provide an indication to the pilot that he should not rely on the apparatus constituting this invention when the light bulb becomes extinguished.

As another example, the failure circuit may include a capacitor which is included in a circuit to become substantially charged upon the introduction of the signals of relatively short duration from the coincidence circuits 36 and 38. This charging circuit can be biased to become responsive only upon the simultaneous introduction of signals from the coincidence circuits 36 and 38. The capacitor may also be included in a discharge circuit having a relatively long "RC" time constant. This time constant may be slightly longer than the time required to obtain a complete revolution of the scanner 10.

The signals from the coincidence circuits 36 and 38 are respectively introduced to input terminals of gating amplifiers 60 and 62. The amplifiers 60 and 62 also receive signals from a disabling circuit 64 so as to pass signals from the amplifiers only during the times that signals are not simultaneously introduced from the disabling circuit. For example, the amplifiers 60 and 62 may be biased to pass the signals from the coincidence circuits 36 and 38 during the times that a negative pulse is not introduced to the amplifiers from the disabling circuit 64. The signals passing through the amplifiers 62 and 64 are respectively introduced to visual indicators such as light bulbs 61 and 63. The light bulbs 61 and 63 may be provided with distinctive colors such as yellow and red, respectively. It should be appreciated that other types of indicators such as aural indicators may be used in replacement for or in conjunction with the light bulbs 61 and 63.

The disabling circuit 64 may be a gating amplifier or any other type of gating circuit which may become operative upon the simultaneous introduction of a pair of signals. One of the signals may be introduced to the disabling circuit 64 from the amplifier 18 and may be produced at the time that the scanning apparatus 10 is pointing toward an artificial target such as an antenna or a heat source. This artificial target may be disposed at a particular position on the airplane 12 such as on the tail of the airplane. The other signal introduced to the disabling circuit 64 may be produced upon the closure of a switch 66 (Figures 1 and 3), the movable contact of which is actuatable by a cam 67 (Figure 3) rotatable with the scanning apparatus 10.

By controlling the closure of the switch 66 in the manner described in the previous paragraph, the closure of the switch may be made to occur in synchronization with the pointing of the scanning apparatus 10 toward the artificial target on the tail of the airplane 12. The stationary contact of the switch 66 may be connected to the disabling circuit 64, and the movable contact of the switch may be connected to the positive terminal of a voltage source such as a battery 68. The negative terminal of the switch 66 may be grounded. In this way, the disabling circuit 64 may receive a positive biasing potential from the battery 68 when the switch 66 becomes closed. This positive bias may render the disabling circuit 64 conductive to the pulses from the amplifier 18 so as to produce a negative output signal from the disabling circuit. This negative signal biases the gating amplifiers 60 and 62 against becoming conductive.

It should be appreciated that the construction and operation of the disabling circuit 64 have been described in the previous two paragraphs only by way of example. By way of further illustration, no artificial target may be necessary so that only the potential on the stationary contact of the switch 66 becomes introduced to the disabling circuit 64 and to the amplifier 18. In this way, signals pass through the amplifier 18 at a constant angular position in each scanning cycle relative to the position of the searching airplane 12. At the same time, the signals pass through the disabling circuit 64 to bias the amplifiers 62 and 64 against the passage of signals through the amplifiers.

The signals from the oscillator 46 are introduced to the erase head 30 to provide a recording of pulses of a uniform polarity of successive positions on the drum 22. The signals from the oscillator 46 may also be introduced to an erase head 72 corresponding to the erase head 30 and to a write head 74, the latter head also receiving signals from the amplifier 18. The erase head 72 and the write head 74 may be magnetically coupled to an endless tape 76, which is movable at a constant speed. In this way, the signals produced by the amplifier 18 at any instant may be recorded by the write head 74 on the tape 76 and may be retained on the tape for a particular period of time such as 15 minutes. After this period of time, the signals recorded on the tape may be erased by the head 72 so that fresh information can be recorded.

The scanning apparatus 10 preferably rotates at a constant angular rate to sweep the space surrounding the aircraft 12 for the detection of objects in the vicinity of the airplane. The scanning apparatus 10 is provided with a directional antenna such that it can sense a limited angular range at any instant. When the scanning apparatus 10 is pointing at a member such as the aircraft 14 in the vicinity of the airplane 12, it detects the presence of the aircraft 14 and causes the detector 13 to produce a signal representing this detection. In the preferred embodiment of the invention, infra-red apparatus may be used to detect the aircraft 14 by receiving heat rays radiated from the aircraft 14.

The signals produced by the detector 13 are amplified by the stage 18 and are introduced to the write head 20 for recording on the drum 22. Since the drum 22 rotates at a constant angular rate relative to the movements of the scanning apparatus 10, successive positions on the drum 22 are presented to the write head 20 as the scanning apparatus 10 sweeps the sky in a repetitive pattern. In this way, a signal representing the detection of the aircraft 14 at a particular angular position in one scanning cycle is recorded on the drum 22 by the write head 20 and is read by the head 24 at a corresponding angular position in the next cycle. Similarly, the signal is read by the head 26 at the same angular position two scanning cycles after the reading of the signal by the head 24.

The signals passing through the amplifier 18 are further amplified by the stage 32 and are introduced to the coincidence circuit 36. Similarly, signals read by the head 24 are introduced through the stages 42 and 40 to the coincidence circuit 36. The signals from the oscillator 46 are able to pass through the pre-amplifier 42 only upon the production of a signal in the read head 24 in representation of the detection of an aircraft such as the aircraft 14. This signal from the read head 24 provides the pre-amplifier 42 with a proper bias to obtain the passage of oscillatory signals from the oscillator 46.

For a constant relative bearing between the searching airplane 12 and the aircraft 14, signals are simultaneously introduced to the coincidence circuit 36 from the amplifiers 32 and 40 because of the synchronous relationship in the movements of the scanning apparatus 10 and the drum 22. This simultaneous introduction of signals to the coincidence amplifier 36 from the amplifiers 32 and 40 indicates that the relative bearing between the searching airplane 12 and the aircraft 14 has remained constant for the period of time required to obtain a single scan. Since the period of time required to obtain a single scan may be in the order of one-half second, the airplane 12 and the aircraft 14 will have travelled a considerable distance during this time. For example, the airplane 12 and the aircraft 14 may have travelled approximately 300 feet in the time required to obtain a single scan by the apparatus 10 when the airplane and aircraft are travelling at speeds of approximately 360 miles per hour. Upon the passage of a signal by the coincidence circuit 36, the light bulb 61 on the front panel of the cockpit in the searching airplane 12 becomes illuminated so as to provide a cautionary indication to the pilot. As previously described, the light bulb 61 may have a distinctive color such as yellow when illuminated.

The constant bearing between the airplane 12 and the aircraft 14 in a collision course may be seen from Figure 2. The bearing angle is indicated as $\theta 1$, $\theta 2$, $\theta 3$ and $\theta 4$ for successive instants of time. The angle is measured at any instant between a line of sight extending from the airplane 12 to the aircraft 14 and a line extending along the course of the airplane 12 at that instant. Although the diagram shown in Figure 2 represents straight line paths for the airplane 12 and the aircraft 14, the relative bearing between the airplane 12 and the aircraft 14 remains essentially constant over a short time for a collision course between the aircraft even when the airplane 12 and the aircraft 14 are travelling on curved or erratic paths, if the time between successive scans is sufficiently small.

The coincidence circuit 38 operates to compare the signals produced in each scanning cycle with the signals produced three cycles before the particular scanning cycle. When signals simultaneously pass through the amplifier 18 and the read head 26 to indicate a constant bearing between the searching airplane 12 and the aircraft 14 over a period of three successive scanning cycles, the coincidence circuit 38 passes a signal which causes the light bulb 63 to become illuminated. This light provides a visual indication in a distinctive color such as red to represent a clear warning to the pilot that a collision may be becoming imminent. Upon the illumination of the light bulb 63, the pilot should take immediate steps to vary his course so as to avoid the aircraft 14.

As previously described, an antenna may be disposed on the tail of the searching airplane 12 to obtain the production of a reference signal by the scanning apparatus 10 at a particular angular position in each scanning cycle. This angular position remains constant in successive cycles relative to the bearing of the searching airplane 12. At the same time that the reference signal is produced in each scanning cycle, the switch 66 becomes closed to activate the disabling circuit 64. When the disabling circuit becomes activated, pulses are introduced to the gating amplifiers 60 and 62 to prevent the passage of signals from the coincidence circuits 36 and 38 to the light bulbs 61 and 63, respectively. In this way, the light bulbs 61 and 63 cannot become illuminated by the production of the reference signals in the successive scanning cycles. This prevents the erroneous indication of a constant bearing course at the time that the tail is being scanned in each revolution of the scanning apparatus 10.

The reference signals also pass through the amplifiers 32 and 34 to the coincidence circuits 36 and 38, respectively. The reference pulses are further recorded by the write head 20 in the drum 22 so as to become subsequently available to the read heads 24 and 26. In this way, a reference signal passes through the amplifier 18 at the same time that the reference signal passes through the read head 24 from the previous scan. This causes the coincidence circuit 36 to pass a signal to the failure circuit 54. Similarly, the coincidence circuit 38 passes a signal in each scanning cycle at the time that the reference signal passes through the amplifier 18.

The passage of reference signals through the coincidence circuits 36 and 38 in each scanning cycle causes the failure circuit 54 to operate in such a manner that the light bulb 56 remains illuminated. However, in case of any breakdown in the apparatus constituting this invention or in the scanning apparatus 10, the reference signal will not pass through the coincidence amplifiers 36 and 38 in the successive scanning cycles. Since the failure circuit 54 is provided with parameters to operate in its second state only upon the introduction of a signal in each scanning cycle, the failure circuit will revert to its first state of operation when it fails to receive a reference signal in one of the scanning cycles. This will cause the light bulb 56 to become extinguished so that the pilot will become aware as to the malfunctioning of the apparatus constituting this invention or as to the malfunctioning of the scanning apparatus 10.

Visual displays may also be provided to indicate the bearing of the aircraft 14 relative to the searching airplane 12 at any instant. Such visual displays may be obtained by providing an indicator 100 in Figure 3 such as an oscilloscope which sweeps in an angular pattern in synchronous relationship with the scanning apparatus 10. By providing for the introduction of signals to the indicator 100 upon the detection of the aircraft 14, the relative bearing between the searching airplane 12 and the aircraft 14 can be made instantly available. By way of further illustration, the signals from the gating amplifier 60 can be introduced to the indicator 100 to produce a yellow indication, and the signals from the gating amplifier 62 can be introduced to the indicator 100 to produce a red indication.

The signals produced by the detector 13 in each scanning cycle may be introduced to the write head 74 for recording in the tape 76. Since the tape is endless, this information is retained for a particular period of time such as fifteen minutes before it is presented to the erase head 72. The erase head 72 then operates to eliminate the signals so that new information can be recorded on the tape. In this way, the tape 76 provides a record as to the last fifteen minutes of a flight. In case of a collision, the tape 76 can be recovered and can be played back to determine how the collision occurred. It should be appreciated that the tape 76 and the heads 72 and 74 are included to provide additional advantages and do not have to be considered as an essential part of the system constituting this invention.

It should be appreciated that the apparatus constituting this invention also provides an illumination of the light bulbs 61 and 63 when the searching airplane 12 and the aircraft 14 are proceeding on a parallel course relative to each other. Since a collision between the searching airplane 12 and the aircraft 14 cannot occur when they are proceeding on a parallel course, a false indication as to the possibility of a collision may be produced. Also, an indication of collision may be obtained when the aircraft 12 and the aircraft 14 are on courses diverging from a collision point. However, these cases are not critical since the pilot of the searching airplane 12 has the option of assessing the situation without changing his course or can change his course slightly so as to eliminate the production of any collision signals. The production of collision signals in certain instances actually involving no possibility of producing a collision cannot be considered as critical provided that signals are always produced when a collision can occur.

The apparatus described above has certain important advantages. It indicates the imminence of a collision in a simple and straightforward manner by checking the relative bearing between the searching airplane and the other aircraft in successive scanning cycles. The apparatus provides such indications since the relative bearing between the searching airplane and other aircraft remains constant when the searching airplane and the other aircraft are approaching each other on a collision course. The apparatus is further advantageous in that it provides a constant check as to the proper functioning of the apparatus and provides a distinctive indication when the apparatus is not functioning properly.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination in a first aircraft for detecting the movements of a second aircraft relative to the first aircraft in a collision course toward the first aircraft, detecting means operative to produce a repetitive pattern of signals indicating the bearing of the second aircraft relative to the first aircraft in each repetitive pattern, storage means coupled to the detecting means for recording the repetitive pattern of the signals produced by the detecting means and for providing for the production of the stored signals a particular time after the recording of these signals, and coincidence means responsive to the signals produced by the detecting means and by the storage means for providing an output indication representing a collision course upon the simultaneous presentation of signals to the coincidence means from the detecting and storage means.

2. In combination in a first aircraft for detecting the movements of a second aircraft relative to the first aircraft in a collision course toward the first aircraft, means including electrical circuitry and infrared detection means for scanning the space around the first member in a repetitive angular pattern and for producing signals upon the detection of the second aircraft during the scan and at times in the scan dependent upon the angular position of the second aircraft relative to the first aircraft, storage means having a plurality of positions and coupled to the scanning means for storing in successive positions signal indications representing the detection or lack of detection of the second aircraft during the scan, transducing means coupled to the storage means for indicating during each particular scan the signal indications stored in the storage means at a corresponding position in a previous scan, and means including electrical circuitry responsive to the signal indications produced by the scanning means and the transducing means at any instant for producing an output indication representing a collision course upon the occurrence in successive scans of a constant bearing of the second aircraft relative to the first aircraft.

3. In combination in a first vehicle for detecting the movements of a second vehicle relative to the first vehicle in a collision course toward the first vehicle, means including electrical circuitry for scanning the space around the first vehicle in a cyclical annular pattern and for producing signals in each scan upon the detection of the second vehicle and in accordance with the time in the scan for such detection, means including magnetic storage means having a plurality of positions and including first transducing means disposed in magnetically coupled relationship to the storage means and in electrically coupled relationship to the scanning means for recording at successive positions along the storage means the signals produced at successive intants by the scanning means, means including second transducing means disposed in coupled relationship to the storage means at a particular position along the storage means for reading the signals recorded in the storage means in a particular one of the previous scanning cycles and at annular positions in the particular one of the previous scanning cycles corresponding to the annular position presently being scanned by the scanning means, and means including coincidence means for passing a signal representing the probability of a collision between the first and second vehicles upon the simultaneous introduction of a signal to the first transducing means and the simultaneous production of a signal by the second transducing means.

4. In combination in a first aircraft for detecting the movements of a second aircraft relative to the first aircraft in a collision course toward the first aircraft, means for scanning the atmosphere in a repetitive angular pattern and for producing signals upon the detection of the second aircraft in each scan, means including storage means movable in synchronism with the scanning means and coupled to the scanning means for recording the detection of the second aircraft at a position in the storage means related to the angle of detection of the second aircraft, transducing means coupled to the storage means for providing for the passage of signals from the storage means in a subsequent scan after each particular scan producing the recording in the storage means and for providing for the passage of the signals in synchronism with the subsequent scan, and means coupled to the scanning means and to the transducing means for comparing the signals produced in each particular scan and in the subsequent scan to produce an output signal upon the occurrence of a coincidence of signals in the comparison.

5. In combination in a first member for detecting the movements of a second member relative to the first member in a collision course toward the first member, means including electrical circuitry and infrared detection means for providing an angular scan on a cyclic basis of the space surrounding the first member and for producing signals upon the detection of the second member during each scan and for providing a reference pulse at a particular position in each cycle of scan, means including storage means responsive to the signals produced by the scanning means for recording these signals in the storage means, means including coincidence means responsive to the signals produced by the scanning means and the signals recorded in the storage means for producing output indications upon the occurrence of signals at the same angular position in successive cycles of scan, and means including failure circuitry responsive to the reference pulses in the successive cycles of scan to produce indications representing a lack of proper operation of the apparatus upon a failure to produce reference pulses in the successive cycles of scan.

6. In combination in a first member for detecting the movements of a second member relative to the first member in a collision course toward the first member, means including scanning means rotatable through successive revolutions and including infra-red detecting means in the scanning means for producing at a particular time in each revolution signals representing the bearing of the second member relative to the first member, means including magnetic storage means having a plurality of positions for the recording of signals and movable with the scanning means to present successive positions for the recording of signals and including a write head magnetically coupled to the magnetic storage means and electrically coupled to the scanning means for recording in the storage means the signals produced by the scanning means, means including a read head magnetically coupled to the storage means and displaced from the write head by a distance corresponding to the movement of the storage means in an integral number of revolutions of the scanning means for reading the signals previously recorded in the storage means, means including coincidence circuitry responsive to the signals produced by the scanning means and the read head for producing an output signal representing a collison course upon an occurrence of such coincidence, and an indicator coupled to the coincidence circuitry for producing an output indication upon the production of an output signal by the coincidence circuitry.

7. In combination in a first member for detecting the movement of a second member relative to the first member in a collision course toward the first member, scanning means for searching for the second member in a cyclic sweep around the first member and for producing signals representing the relative bearing between the first and second members in each cyclic sweep, storage means coupled to the scanning means for receiving and retaining the signals produced by the scanning means for a plurality of successive sweeps, first transducing means coupled to the storage means for reading signals from the storage means at a first particular sweep after the recording of the signals in the storage means and in synchronous relationship in the sweep relative to the previous recording of the signals in the storage means, second transducing means coupled to the storage means for reading signals from the storage means at a second particular sweep after the recording of the signals in the storage means and subsequent to the first particular sweep and in synchronous relationship in the sweep relative to the previous recording of the signals in the recording means, first coincidence means coupled to the scanning means and the first transducing means for producing a first output signal upon the simultaneous production of signals by the scanning means and the first transducing means, second coincidence means coupled to the scanning means and the second transducing means for producing a second output signal upon the simultaneous production of signals by the scanning means and the second transducing means, first indicating means responsive to the first output signal for providing a first distinctive indication to provide an initial warning, and second indicating means responsive to the second output signal for providing a second distinctive indication to provide a secondary warning.

8. In combination in a first member for detecting the movements of a second member relative to the first member in a collision course toward the first member, means including scanning means for scanning in a cyclic angular pattern to detect the presence of the second member and for producing signals upon such detection and for producing the signals at particular times in the sweep to represent the bearing of the second member and for producing reference signals at a particular angular position in each sweep, means including a magnetic storage member having a plurality of positions for the storage of signals and including a write head magnetically coupled to the storage member and electrically coupled to the scanning means for storing in the successive positions of the magnetic storage member the signals produced by the scanning means in the cyclic scans, means including a read head magnetically coupled to the storage means for reading the signals stored in the storage means a particular number of cycles after the recording of the signals in the storage means and in angular synchronization with such recording of the signals, means including electrical coincidence circuitry coupled to the scanning means and the read head for producing first output indications upon a simultaneous production of signals in the scanning means and the read head, means including electrical disabling circuitry coupled to the scanning means and the read head for preventing the production of the first output indications upon the production of the reference pulses, and means including electrical failure circuitry coupled to the coincidence circuitry for producing a second output indication upon a failure of the coincidence circuitry to pass the reference pulses in the successive cycles of scanning.

9. In combination in a first member for detecting the movements of a second member relative to the first member in a collision course toward the first member, means including electrical circuitry for scanning the space around the first member in a repetitive angular pattern and for producing signals in each scan upon the detection of the second member and in accordance with the angular position of such detection and for producing a reference signal at a particular angular position in a repetitive pattern during the scan, means including storage means coupled to the scanning means for recording the signals produced by the scanning means at successive instants of time and for retaining the signals recorded in the storage means during a particular number of previous scans, means including transducing means coupled to the storage means for reading the information recorded in the storage means in each scan at an angular position in the scan corresponding to the recording of the information in the storage means in a particular one of the preceding scans, means including coincidence circuitry for producing an output pulse upon the simultaneous production of signals by the scanning means and the transducing means to represent a constant bearing between the first and second members in sequential scans, means including disabling circuitry responsive to the scanning means and the transducing means and coupled to the coincidence circuitry for preventing the passage of the reference signals through the coincidence circuitry, and means including failure circuitry responsive to the signals from the scanning means and the transducing means for indicating the failure to produce the reference signals in successive cycles of scanning.

10. In combination in a first member for detecting the movements of a second member relative to the first member in a collision course toward the first member, means including scanning means rotatable at a substantially constant rate through successive revolutions and including detecting means coupled to the scanning means for producing at particular instants in each revolution signals representing the relative bearing between the first and second members at these instants and for producing reference signals representing a constant bearing in each revolution relative to the first member, means including storage means movable in a closed loop and having a plurality of positions and including first transducing means coupled to the storage means and to the detecting means for recording in successive positions in the storage means the signals produced by the detecting means, means including second transducing means coupled to the storage means for reading the information in the storage means a particular number of integral revolutions of the scanning means after the recording of the signals in the scanning means, means including coincidence circuitry responsive to the signals from the detecting means and from the second transducing means for producing output signals upon a coincidence in the signals from the detecting and transducing means, means including a gated amplifier coupled to the coincidence circuitry for passing the output signals from the coincidence circuitry, means including disabling circuitry responsive to the signals from the detecting means and coupled to the gated amplifier for preventing the passage of the reference signals through the amplifier, and an output indicator coupled to the gating amplifier to become energized by the output signals passing through the amplifier.

11. In combination in a first member for detecting the movements of a second member relative to the first member in a collision course toward first member, means including scanning means rotatable at a substantially constant rate through successive revolutions and including detecting means coupled to the scanning means for producing at particular instants in each revolution signals representing the relative bearing between the first and second members at these instants and for producing reference signals representing a constant relative bearing in each revolution, means including magnetic storage means movable in a closed loop with the scanning means and having a plurality of positions for the recording of signals and including a write head electrically coupled to the detecting means for recording at successive positions in the storage means the signals produced by the detecting means, means including a first read head magnetically coupled to the storage means and displaced from the write head in the direction of movement of the storage means by a distance corresponding to that produced in a single integral revolution of the scanning means, means including a second read head magnetically coupled to the storage means and displaced from the write head in the direction of movement of the storage means by a distance corresponding to that produced in a plurality of integral revolutions of the scanning means, means including first coincidence circuitry coupled to the scanning means and the first read head for producing a first output signal upon a coincidence in the signals produced by the scanning means and the first read head, means including a first gating amplifier coupled to the first coincidence circuit for passing the first output signal, means including a first indicator coupled to the first gating amplifier for producing a first distinctive indication, means including second coincidence circuitry coupled to the scanning means and the second read head for producing a second output signal upon a coincidence in the signals produced by the scanning means and the second read head, means including a second gating amplifier coupled to the second coincidence circuit for passing the second output signal, means including a second indicator coupled to the second gating amplifier for producing a second distinctive indication, means including a disabling circuit coupled to the first and second gating amplifiers and the scanning means for preventing the passage of the reference signals through the gating amplifiers to the first and second indicators, and means including a failure circuit coupled to the coincidence circuits and including a third indicator for producing a third distinctive output indication upon the failure of the coincidence circuits to pass signals in each revolution of the scanning means.

12. The combination set forth in claim 2 in which indicating means are coupled to the scanning means to sweep angularly in synchronous relationship with the scanning means and in which the indicating means are responsive to the signal indications produced by the scanning means and the transducing means to provide a visual indication as to the relative bearing between the first and second aircrafts in the collision course.

13. The combination set forth in claim 6 in which the indicator is coupled to the scanning means to provide an angular sweep in synchronous relationship with the rotary movements of the scanning means and in which the indicator is responsive to the output signal from the coincidence circuitry to provide an output indication as to the relative bearing between the first and second members in the collision course.

14. The combination set forth in claim 9 in which second storage means are included and in which second transducing means are coupled to the scanning means for recording in the storage means the signals detected by the scanning means in the successive scans and in which third transducing means are coupled to the storage means to prepare the storage means for the recording of new information after the recorded information has been retained in the storage means for a particular period of time.

15. The combination set forth in claim 4 in which second transducing means are coupled to the coincidence circuitry to receive the signals passing through the coincidence circuitry and in which second storage means are responsive to the signals in the second transducing means to record these signals and are movable to successive positions in a closed loop to provide a record for a particular period of time.

16. In combination in a first aircraft for detecting the movements of a second aircraft relative to the first member in a collision course toward the first aircraft, detecting means operative to produce a repetitive pattern of signals indicating the relative bearing between the first and second aircrafts in each repetitive pattern, means coupled to the detecting means for storing the repetitive pattern of the signals produced by the detecting means and for providing for the release of the storage signals a particular time after the storage of the signals, and comparison means responsive to the signals produced by the detecting means and by the storage means for providing an output indication representing the collision course upon the occurrence of a timed relationship between the signals from the detecting and storage means.

17. In combination in a first aircraft for detecting the movements of a second aircraft relative to the first aircraft in a collision course toward the first aircraft, means for scanning the atmosphere in a repetitive angular pattern and for producing the signals upon the detection of the second aircraft for each scan, means including storage means coupled to the scanning means for recording the detection of the second member by the scanning means, the storing means being constructed to provide a delay in the passage of signals from the storage means wherein the delay is related to the repetitive scanning by the scanning means, and means coupled to the scanning means and to the storing means for comparing the signals produced in each particular scan and the signals from the storing means to produce an output signal upon the occurrence of a particular relationship between the signals from the scanning means and the signals from the storage means.

References Cited in the file of this patent

UNITED STATES PATENTS 2,684,468     McClure _____ July 20, 1954

OTHER REFERENCES

Klass: "Infrared to Get Collision Warning Trial," Aviation Wheels, August 12, 1957, pages 77 to 84.

Brantley: "Radar Offers Solution," Electronics, November 1954; pages 146 to 150.